(12) United States Patent
Lee et al.

(10) Patent No.: US 7,403,513 B2
(45) Date of Patent: Jul. 22, 2008

(54) APPARATUS AND METHOD FOR CODING AND DECODING CQI INFORMATION IN COMMUNICATION SYSTEM USING HIGH SPEED DOWNLINK PACKET ACCESS

(75) Inventors: Ju-Ho Lee, Suwon-shi (KR); Jae-Yoel Kim, Kunpo-shi (KR); Hyeon-Woo Lee, Suwon-shi (KR); Myeong-Sook Seo, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 983 days.

(21) Appl. No.: 10/397,735

(22) Filed: Mar. 26, 2003

(65) Prior Publication Data

US 2003/0185242 A1    Oct. 2, 2003

(30) Foreign Application Priority Data

Mar. 26, 2002 (KR) .................. 10-2002-0016561

(51) Int. Cl.
*H04B 7/216* (2006.01)
*H04B 7/00* (2006.01)

(52) U.S. Cl. ..................... 370/342; 455/522

(58) Field of Classification Search ............... 455/522; 370/278, 342, 329, 332, 441
See application file for complete search history.

(56) References Cited

U.S. PATENT DOCUMENTS

2002/0115467 A1* 8/2002 Hamabe .................. 455/522
2002/0141436 A1* 10/2002 Toskala .................. 370/442
2003/0157900 A1* 8/2003 Gaal et al. ............... 455/69

OTHER PUBLICATIONS

Samsung, "UL Power Control for HSDPA", 3GPP TSG-RAN WG1 #23, Jan. 8-11, 2002.

* cited by examiner

*Primary Examiner*—George Eng
*Assistant Examiner*—Nam Huynh
(74) *Attorney, Agent, or Firm*—The Farrell Law Firm, PC

(57) ABSTRACT

A method for transmitting pilot bits instead of partial bits of CQI (Channel Quality Indicator) information indicating channel quality of an HS-PDSCH (High Speed-Physical Downlink Shared CHannel) in a CDMA (Code Division Multiple Access) communication system such that a Node B can control power of a high-speed uplink control channel. The system transmits high-speed packet data from the Node-B to UE (User Equipment) through the HS-PDSCH, and the UE is located in a handover area between the Node-B and another Node-B adjacent thereto. Predetermined bits are then removed from given bits of the code symbols. The removed bits are then replaced with high-speed pilot bits for power control.

40 Claims, 11 Drawing Sheets

| i | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| 1 | 0 | 1 | 0 | 0 | 1 |
| 2 | 1 | 1 | 0 | 0 | 1 |
| 3 | 0 | 0 | 1 | 0 | 1 |
| 4 | 1 | 0 | 1 | 0 | 1 |
| 5 | 0 | 1 | 1 | 0 | 1 |
| 6 | 1 | 1 | 1 | 0 | 1 |
| 7 | 0 | 0 | 0 | 1 | 1 |
| 8 | 1 | 0 | 0 | 1 | 1 |
| 9 | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |
| 15 | 0 | 0 | 0 | 0 | 1 |
| 16 | 0 | 0 | 0 | 0 | 1 |
| 17 | 0 | 0 | 0 | 0 | 1 |
| 18 | 0 | 0 | 0 | 0 | 1 |
| 19 | 0 | 0 | 0 | 1 | 0 |

FIG.7

| i | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| 1 | 0 | 1 | 0 | 0 | 1 |
| 2 | 1 | 1 | 0 | 0 | 1 |
| 3 | 0 | 0 | 1 | 0 | 1 |
| 4 | 1 | 0 | 1 | 0 | 1 |
| 5 | 0 | 1 | 1 | 0 | 1 |
| 6 | 1 | 1 | 1 | 0 | 1 |
| 7 | 0 | 0 | 0 | 1 | 1 |
| 8 | 1 | 0 | 0 | 1 | 1 |
| 9 | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |

FIG.9

APPARATUS AND METHOD FOR CODING AND DECODING CQI INFORMATION IN COMMUNICATION SYSTEM USING HIGH SPEED DOWNLINK PACKET ACCESS

PRIORITY

This application claims priority to an application entitled "APPARATUS AND METHOD FOR CODING AND DECODING CQI INFORMATION IN COMMUNICATION SYSTEM USING HIGH SPEED DOWNLINK PACKET ACCESS", filed in the Korean Industrial Property Office on Mar. 26, 2002 and assigned Serial No. 2002-16561, the contents of which are incorporated herein by reference.

BACKGROUND OF THE INVENTION

1. Field of the Invention

The present invention relates to an apparatus and method for coding and decoding CQI (Channel Quality Indicator) information in a communication system using an HSDPA (High Speed Downlink Packet Access), and more particularly to an apparatus and method for coding and decoding CQI information to insert a pilot signal into an HS-PDSCH (High Speed-Physical Downlink Shared CHannel) and transmit the HS-PDSCH having the pilot signal inserted therein such that power of a high speed uplink control channel can be controlled.

2. Description of the Related Art

Standardization of an HSDPA (High Speed Downlink Packet Access) based on high-speed downlink data transmission technologies is actively conducted in the 3GPP (Third Generation Partnership Project). First, a UMTS (Universal Mobile Telecommunications system) will be described.

FIG. 1 is an overview illustrating a structure of the UMTS. The UTMS includes a core network 100, a plurality of RNSs (Radio Network Subsystems) 110 and 120, and UE (User Equipment) 130, wherein the UE 130 can also be referred to as a user. The RNSs 110 and 120 are configured by RNCs (Radio Network Controllers) 111 and 112 and a plurality of Node-Bs 113, 114, 115 and 116, wherein a Node-B can also be referred to as a cell. An RNC is referred to as an SRNC (Serving RNC), a DRNC (Drift RNC) or a CRNC (Controlling RNC) according to the RNC's function. Alternatively, the SRNC and the DRNC can be classified by the UE's role.

Hereinafter, the RNCs will be described in detail. The SRNC is an RNC for managing UE information and communicating data with the core network 100. When UE data is transmitted and received through an RNC other than the SRNC, the above-described RNC is the DRNC. The CRNC is an RNC in the process of controlling Node-Bs.

The above-described RNCs will be described with reference to FIG. 1. When the RNC 111 manages information of the UE 130, the RNC 111 becomes the SRNC. When the UE 130 moves and data of the UE 130 is transmitted and received through the RNC 112, the RNC 112 becomes the DRNC. The RNC 111 controlling a Node-B 113 becomes the CRNC corresponding to the Node-B 113.

As described above, the standardization of the HSDPA based on the high-speed downlink data transmission technologies is actively conducted in the 3GPP. Moreover, many fields relating to the HSDPA are discussed. The HSDPA will be described on the basis of contents discussed up to now. The high-speed downlink data transmission is implemented by using a plurality of OVSF codes, adaptive channel coding, and HARQ (Hybrid Automatic Retransmission Request) based on a fast retransmission and soft combining. The maximum number of OVSF (Orthogonal Variable Spreading Factor) codes applicable to one user is 15, and a modulation scheme based on QPSK (Quadrature Phase Shift Keying), 16QAM (Quadrature Amplitude Modulation) or 64QAM is adaptively selected according to channel states. When erroneous data is detected, the data is retransmitted between UE and a Node-B and then the soft combining for a plurality of data is carried out, thereby improving overall communication efficiency. At this time, the retransmission is based on an n-channel SAW HARQ (Stop And Wait Hybrid Automatic Retransmission Request) process.

The n-channel SAW HARQ process will be described in detail. Two new approaches are introduced to the n-channel SAW HARQ process for the HSDPA in order to improve a conventional SAW ARQ (Stop And Wait Automatic Retransmission Request) process.

First, a receiving side temporarily stores erroneous data and combines the erroneous data and retransmitted data, thereby reducing a probability of error occurrence. This is called soft combining. The soft combining is classified into CC (Chase Combining) and IR (Incremental Redundancy). In relation to the CC, a transmitting side uses the same format for a first transmission and retransmission. If m symbols have been transmitted as one coded block at the time of the first transmission, the same m symbols are also retransmitted at the time of the retransmission. That is, the same coding rate is applied to the first transmission and retransmissions. Accordingly, the receiving side combines a first transmitted coded block with a retransmitted coded block, performs a CRC (Cyclic Redundancy Code) check using the combined coded blocks and determines whether an error has been generated.

Next, the IR will be described. In relation to the IR, the transmitting side uses different formats for the first transmission and retransmissions. If n-bit user data has been coded to the m symbols, the transmitting side transmits only a portion of the m symbols at the time of the first transmission and sequentially retransmits remaining portions at the time of the retransmission. For this reason, transmission bits at the first transmission and retransmission are different. Accordingly, the receiving side adds bits received at the first transmission to non-redundant bits received at the retransmission and executes error correction after configuring a coding block having a higher coding rate. In relation to the IR, the first transmission and respective retransmissions are classified by RV (Redundancy Version) values. Thus, the first transmission is referred to as RV 1 a retransmission subsequent to the first transmission is referred to as RV 2 and another retransmission subsequent to the retransmission is referred to as RV 3. The receiving side combines a first transmitted coded block with a retransmitted coded block using version information. An RV value contained in Part-2 of an HS-SCCH (High Speed-Shared Control CHannel) indicates the above-described version information.

The second approach introduced to improve the efficiency of the conventional SAW ARQ process, is as follows. The conventional SAW ARQ process can transmit a next packet only when an ACK (positive acknowledgement) for a previous packet is received, but the n-channel SAW HARQ process can consecutively transmit a plurality of packets in the case where the ACK is not received, thereby improving the utility of a radio link. If n logical channels between UE and a Node-B are configured and the channels are identified by channel numbers in the n-channel SAW HARQ process, the UE on the receiving side can identify a certain channel to which a received packet belongs at an arbitrary point of time.

Moreover, the UE can re-configure received packets in order and take necessary actions such as soft combining of a corresponding packet, etc.

The n-channel SAW HARQ process will be described in detail with reference to FIG. 1. It is assumed that a 4-channel SAW HARQ process is carried out between an arbitrary Node-B 113 and UE 130, and logical identifiers of 1 to 4 are allocated to respective channels. A physical layer between the UE 130 and the Node-B 113 has an HARQ processor corresponding to each channel. The Node-B 113 allocates a channel identifier "1" to a first transmitted coded block (indicating user data transmitted in one TTI (Transmission Time Interval)) and transmits it to the UE 130. If an error has been generated in a corresponding coded block, the UE 130 transfers a coded block to a first HARQ processor 1 corresponding to a channel 1 using the channel identifier, and transmits an NACK (negative acknowledgement) to the channel 1. On the other hand, the Node-B 113 transmits a subsequently coded block to a channel 2 irrespective of the reception of the ACK for the coded block of the channel 1. If an error has been generated also at the subsequently coded block, the coded block is transferred to a corresponding HARQ processor. When the Node-B 113 receives the NACK for the coded block of the channel 1 from the UE 130, it retransmits a corresponding coded block to the channel 1. Thus, the UE 130 transfers the coded block to the first HARQ processor 1 using a channel identifier of the coded block. The first HARQ processor 1 of the UE 130 carries out soft combining for a previously stored coded block and a retransmitted coded block. As described above, the n-channel SAW HARQ process corresponds a channel identifier to an HARQ processor with a one-to-one correspondence. Without delaying user data transmission until the ACK is received, the n-channel SAW HARQ process can appropriately correspond a first transmitted coded block to a retransmitted coded block.

A plurality of UEs can simultaneously use a number of OVSF codes available in the HSDPA. Namely, there is possible concurrent OVSF code multiplexing between the UEs. The concurrent OVSF code multiplexing will be described with reference to FIG. 2.

FIG. 2 shows an exemplary OVSF code assignment in a conventional HSDPA system. The case where an SF (Spreading Factor) is 16 as shown in FIG. 2, will be described.

Referring to FIG. 2, respective OVSF codes can be represented as C(i, j) on the basis of the OVSF code tree. A parameter i of C(i, j) is a value of an SF, and a parameter j of C(i, j) is a code number. For example, when an OVSF code is C(16, 0), an SF is 16 and a code number is 0. At this time, C(16, 0) is a first code of SF=16 in the OVSF code tree. FIG. 2 shows the case where 15 OVSF codes, i.e., C(16, 0) to C(16, 14) corresponding to $1^{st}$ code to $15^{th}$ code of SF=16, are assigned in an HSDPA communication system. The 15 OVSF codes for the UEs can be multiplexed. For example, OVSF codes as shown in the following Table 1 can be multiplexed.

TABLE 1

|    | A              | B              | C              |
|----|----------------|----------------|----------------|
| T0 | C(16, 0)~C(16, 5) | C(16, 6)~C(16, 10) | C(16, 11)~C(16, 14) |
| T1 | C(16, 0)~C(16, 3) | C(16, 4)~C(16, 14) | —              |
| T2 | C(16, 0)~C(16, 3) | C(16, 4)~C(16, 5)  | C(16, 6)~C(16, 14) |

In the above Table 1, A, B and C are arbitrary users, i.e., arbitrary UEs using the HSDPA communication system. As shown in the above Table 1, the UEs A, B and C multiplex OVSF codes assigned to the HSDPA communication system at periods of time T0, T1 and T2. The number of OVSF codes assigned to the UEs and OVSF code positions in the OVSF code tree are determined by the Node-B, utilizing parameters such as the amount of user data of the UE stored in the Node-B, a channel state between the Node-B and UE, etc.

Control information exchanged between the Node-B and UE includes the number of OVSF codes available in the arbitrary UE, code information associated with positions designated on the OVSF code tree, channel quality information needed for determining an adaptive modulation scheme according to a channel state, modulation information, channel number information needed for supporting the n-channel SAW HARQ process, ACK/NACK information, etc. Hereinafter, channels used for transmitting the control information and user data will be described.

The types of channels used in the HSDPA other than channels used in a conventional WCDMA (Wideband Code Division Multiple Access) system are classified by a downlink and uplink as follows. First, downlink channels include an HS-SCCH (High Speed-Shared Control CHannel), an associated DPCH (Dedicated Physical CHannel), and an HS-PDSCH (High Speed-Physical Downlink Shared CHannel), while an uplink channel includes an HS-DPCCH (High Speed-Dedicated Physical Control CHannel).

Timing relations of the channels are shown in FIG. 3. First, the UE measures channel quality between the UE and a Node-B using PCPICH (Primary Common Pilot CHannel), etc., and notifies the Node-B of a result of the measurement through a CQI (Channel Quality Indicator). The CQI is transmitted through the HS-DPCCH. The Node-B carries out a scheduling function using the CQI. The scheduling function decides which UE is to actually receive data for a next TTI among UEs receiving an HSDPA service within the same cell. The scheduling function also decides a modulation scheme to be used for a data transmission, the number of codes to be assigned, etc. If the data transmission for an arbitrary UE is decided, the Node-B transmits control information 301 needed for receiving the data through at least one HS-SCCH. At this time, the UE can identify the HS-SCCH to be received using a UE ID. Moreover, the UE needs to receive a maximum of four HS-SCCHs with considering UE complexity. One cell can easily schedule packet data by operating more than the four HS-SCCHs. A set of HS-SCCHs assigned to the arbitrary UE is referred to as a serving HS-SCCH set. The serving HS-SCCH set can be designated on a UE-by-UE basis. Other details will be described below.

The control information 301 contained in the HS-SCCH is as follows. The control information 301 includes 7-bit information associated with OVSF codes to be used in the HS-PDSCH (hereinafter, referred to as "code information 302"), 1-bit information indicating a modulation scheme to be applied to the HS-PDSCH, 6-bit information indicating a size of data to be sent through the HS-PDSCH, and HARQ information. The HARQ information consists of 7 bits including 1-bit information of a new data indicator indicating whether data to be sent through the HS-PDSCH is new data or not, 3-bit information relating to an RV value of data to be sent through the HS-PDSCH, and a 3-bit channel number associated with n-channel SAW HARQ of data to be sent through the HS-PDSCH. FIG. 4 shows a structure of the HS-SCCH.

As shown in FIG. 4, the HS-SCCH is transmitted on the basis of OVSF codes of SF=128, and divided into three parts of Part-1, Part-2 and a CRC. The 8 Part-1 information bits is coded with 40 bits in a first slot of an HS-SCCH frame, and the 13 Part-2 information bits and 16 CRC information bits are coded with 80 bits in second and third slots of the HS-SCCH frame. UE carries out individual channel codings of the Part-1 information and the Part-2 information. Although the UE receives only the Part-1 information in the first slot, the UE can identify which of the four HS-SCCHs sends control information needed for receiving an HS-PDSCH.

The Part-1 information includes code information indicating positions on the code tree of OVSF codes to be used in certain UE, the number of the OVSF codes, and modulation scheme information. FIG. 5 shows a scrambler based on the channel coding of the Part-1 information and UE ID needed for identifying UE after receiving the Part-1 information. The Part-1 information is coded by a rate ½ convolutional coder and then rate-matched producing 40 bits corresponding to one slot through a rate-matching algorithm. A 10-bit UE ID is coded by a (32, 10) block code used in coding of TFCI (Transport-Format-Combination Indicator) based on Rel. '99 specifications and then 32 bits are produced. The produced 32 bits are then extended to 40 bits by repeating the first 8 bits. The 40 bits based on the Part-1 information are XORed with 40 bits based on the UE ID. As a result, a scrambling procedure based on the UE ID is completed.

The Part-2 information includes information relating to a size of a TB (Transport Block) indicating a length of data to be sent through the HS-PDSCH, a channel number of n-channel SAW HARQ, a new data indicator indicating whether corresponding data is new data or retransmission data, and an RV value indicating which version the corresponding data is based on, in relation to the IR.

The CRC information includes a result of a CRC check for the Part-1 information and the UE ID. The UE ID may consist of 10 bits and the UE ID itself is not separately sent. The transmitting and receiving sides produce the UE ID at a time of calculating a CRC, respectively. Thus, the UE can identify whether information contained in an arbitrary HS-SCCH is its own information or not. For example, where control information is transmitted to UE A through the HS-SCCH, a Node-B produces the CRC using the Part-1 and Part-2 information and the UE A's ID. When the UE A calculates a CRC using its own UE ID and the Part-1 and Part-2 information, it determines that the control information has been successfully received through the HS-SCCH if an error is not detected by the CRC check.

An operation of the UE receiving HS-SCCHs is as follows. The UE generates a scrambling sequence using a stored UE ID, scrambles an HS-SCCH corresponding to a first slot in four HS-SCCHs, and performs Viterbi decoding of a convolutional code. Then, the UE identifies the HS-SCCHs allocated to its own UE and receives control information needed for receiving the HS-SCCHs. After receiving the control information of the HS-SCCHs, the UE calculates a CRC using the Part-1 and Part-2 information and its own UE ID, and determines that the control information has been successfully received if an error is not detected in the CRC check. Then, decoding of HS-PDSCH information is performed and the decoding is stopped if an error is detected in the CRC check.

The UE performs necessary operations such as demodulation of data received through the HS-PDSCH on the basis of the information received through the HS-SCCH. At this time, through code information, the UE determines whether it receives an HS-PDSCH based on what OVSF code and determines how to demodulate the HS-PDSCH on the basis of modulation information. The UE decodes data received through the HS-PDSCH. After the decoding procedure is completed, the UE determines whether erroneous data is detected in a CRC check and then transmits ACK/NACK information. That is, if erroneous data is not detected, the ACK in transmitted. Otherwise, the NACK is transmitted.

The UE transmits the ACK/NACK information for packet data and CQI information associated with a downlink channel state through an HS-DPCCH. A structure of the HS-DPCCH is shown in FIG. 6. In terms of the HS-DPCCH, a spreading factor SF=256 and an HS-DPCCH sub-frame corresponds to three slots. The ACK/NACK information is transmitted in a first slot of the HS-DPCCH sub-frame. In second and third slots of the HS-DPCCH sub-frame, the CQI information is transmitted. One-bit ACK/NACK information is repeated ten times such that 10 bits can be outputted. Five-bit CQI information is coded by (20, 5) channel coding such that 20 bits can be outputted.

That is, the CQI information is provided to identify a state of a downlink channel. The CQI information is needed to identify the channel's state. Hence, when UE or a system is implemented, its complexity increases in channel coding and decoding.

SUMMARY OF THE INVENTION

Therefore, the present invention has been made in view of the above problem, and it is an object of the present invention to provide an apparatus and method for performing channel coding and decoding without increasing complexities of UE (User Equipment) and a Node-B in relation to CQI (Channel Quality Indicator) information, which varies according to the existence of a pilot signal sent from the UE to the Node-B through an HS-DPCCH (High Speed-Dedicated Physical Control CHannel) transmitting control information.

It is another object of the present invention to provide an apparatus and method for transmitting a signal of an HS-DPCCH (High Speed-Dedicated Physical Control CHannel), which carries an ACK (positive acknowledgement)/NACK (negative acknowledgement) signal indicating whether an error is detected in high-speed packet data that UE (User Equipment) using an HSDPA (High Speed Downlink Packet Access) service receives from a Node-B, and CQI (Channel Quality Indicator) information and a pilot signal sent to a Node-B after measuring quality of a channel received from the Node-B.

It is yet another object of the present invention to provide a system capable of efficiently implementing channel coding of CQI (Channel Quality Indicator) information, which varies according to the existence of pilot bits sent through an HS-DPCCH (High Speed-Dedicated Physical Control CHannel) for a channel compensation and power control associated with the HS-DPCCH when UE (User Equipment) receiving an HSDPA (High Speed Downlink Packet Access) service is located in a soft handover area.

In accordance with one aspect of the present invention, the above and other objects can be accomplished by the provision of UE (User Equipment), comprising a CQI (Channel Quality Indicator) coder for receiving 5-bit CQI information indicating the quality of a Node-B signal transferred to the UE and outputting 20 code bits; a controller for carrying out a control operation such that 15 code bits except the last 5 bits of the 20 code bits are outputted or the 20 code bits are outputted and a transmitter for multiplexing the 15 code bits and the 5 pilot bits to transmit a multiplex signal in two slots when the 15 code bits are received, and transmitting the 20 code bits in the two slots when the 20 code bits are received.

In accordance with another aspect of the present invention, there is provided a Node-B, comprising a receiver for receiving 15 code bits except the last 5 bits of 20 code bits generated by coding 5-bit CQI (Channel Quality Indicator) information, and pilot bits of 5 bits in two slots or receiving the 20 code bits generated by coding the 5-bit CQI information in the two slots; a channel compensator for carrying out a channel compensation for received data using, the pilot bits when the pilot bits are received; and a decoder for carrying out a decoding operation using the 15 code bits to output the 5-bit CQI information when the pilot bits are received.

In accordance with another aspect of the present invention, there is provided a method for performing a transmission operation in UE (User Equipment), comprising the steps of (a) outputting 20 code bits by coding 5-bit CQI (Channel Quality Indicator) information; (b) outputting 15 code bits except last 5 bits of the 20 code bits; and (c) multiplexing the 15 code bits and pilot bits of the 5 bits to transmit a multiplex signal in two slots.

In accordance with another aspect of the present invention, there is provided UE (User Equipment), comprising a controller for determining whether 15 code bits or 20 code bits must be generated; a coder for combining basis codes of predetermined length 20 to output code bits of length 20 predetermined by the controller or combining basis codes of length 15 except last 5 bits of the basis codes of length 20 to generate code bits of length 15; and a transmitter for transmitting the 20 code bits in the two slots when the 20 code bits are received, and multiplexing the 15 code bit and pilot bits of the 5 bits to transmit a multiplex signal in two slots when the 15 code bits are received.

In accordance with another aspect of the present invention, there is provided a method for performing a transmission operation in UE (User Equipment), comprising the steps of (a) determining whether 15 code bits or 20 code bits must be generated; (b) combining basis codes of predetermined length 20 to generate code bits of length 20 predetermined by a controller or combining basis codes of length 15 except the last 5 bits of the basis codes of length 20 to generate code bits of length 15; and (c) transmitting the 20 code bits in the two slots when the 20 code bits are generated, and multiplexing the 15 code bits and the 5 pilot bits to transmit a multiplex signal in two slots when the 15 code bits are generated.

In accordance with another aspect of the present invention, there is provided an apparatus for transmitting a signal of a high speed-dedicated physical channel in UE (User Equipment), comprising a coder for receiving 5-bit CQI (Channel Quality Indicator) information indicating quality of a Node-B's signal transferred to the UE, combining predetermined basis codes of length 15 based on the CQI and generating 15 code bits; and a transmitter for transmitting, in a first slot, information indicating whether an error is detected in high speed downlink packet data received from the Node-B, multiplexing the code bits and predetermined pilot bits of 5 bits and transmitting a multiplex signal in second and third slots.

BRIEF DESCRIPTION OF THE DRAWINGS

The above and other objects, features and other advantages of the present invention will be more clearly understood from the following detailed description taken in conjunction with the accompanying drawings, in which:

FIG. 7 is a table illustrating basis vectors for CQI (Channel Quality Indicator) coding where pilot bits are not inserted into the HS-DPCCH being the uplink control channel for the HSDPA according to an embodiment of the present invention;

FIG. 9 is a table illustrating basis vectors for CQI coding where pilot bits are inserted into an HS-DPCCH being an uplink control channel for an HSDPA in accordance with the present invention;

DETAILED DESCRIPTION OF THE PREFERRED EMBODIMENTS

Figure 1:
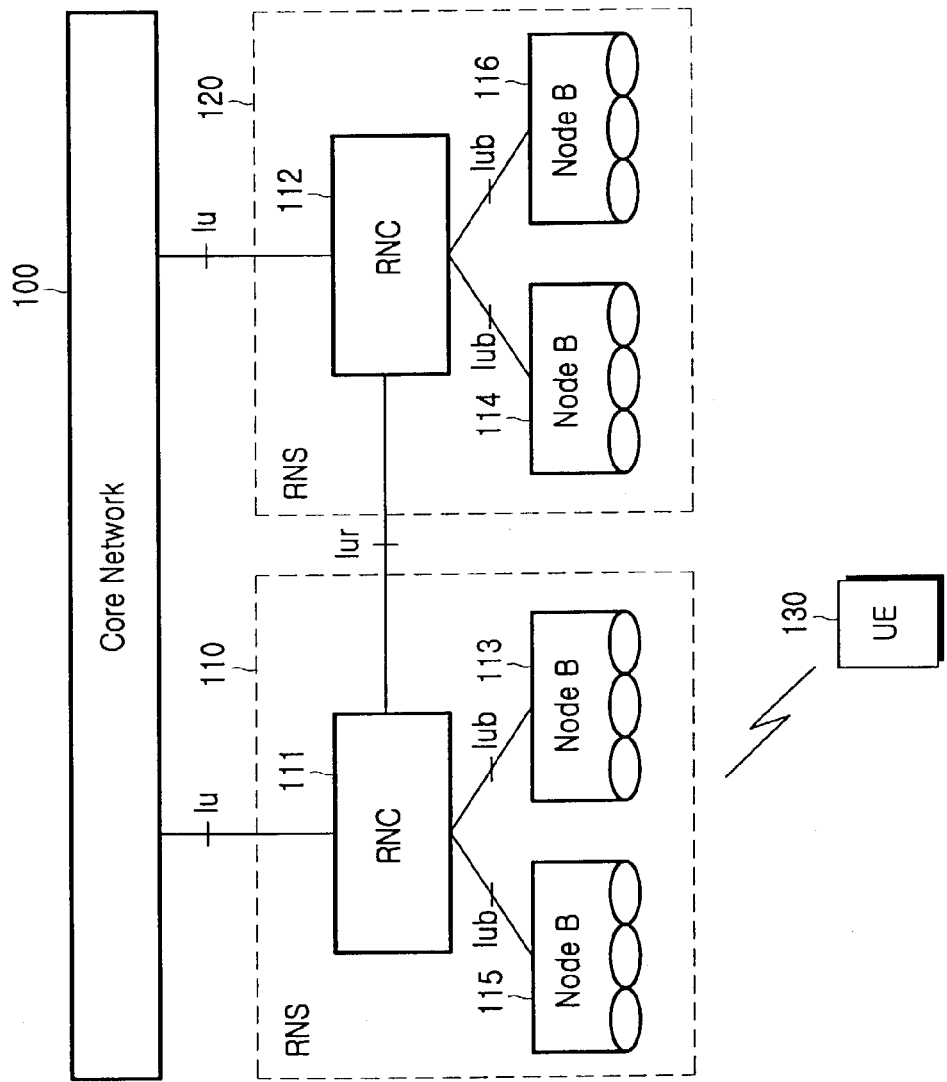
FIG. 1 is an overview illustrating a structure of a UMTS (Universal Mobile Telecommunications System)
Figure 2:
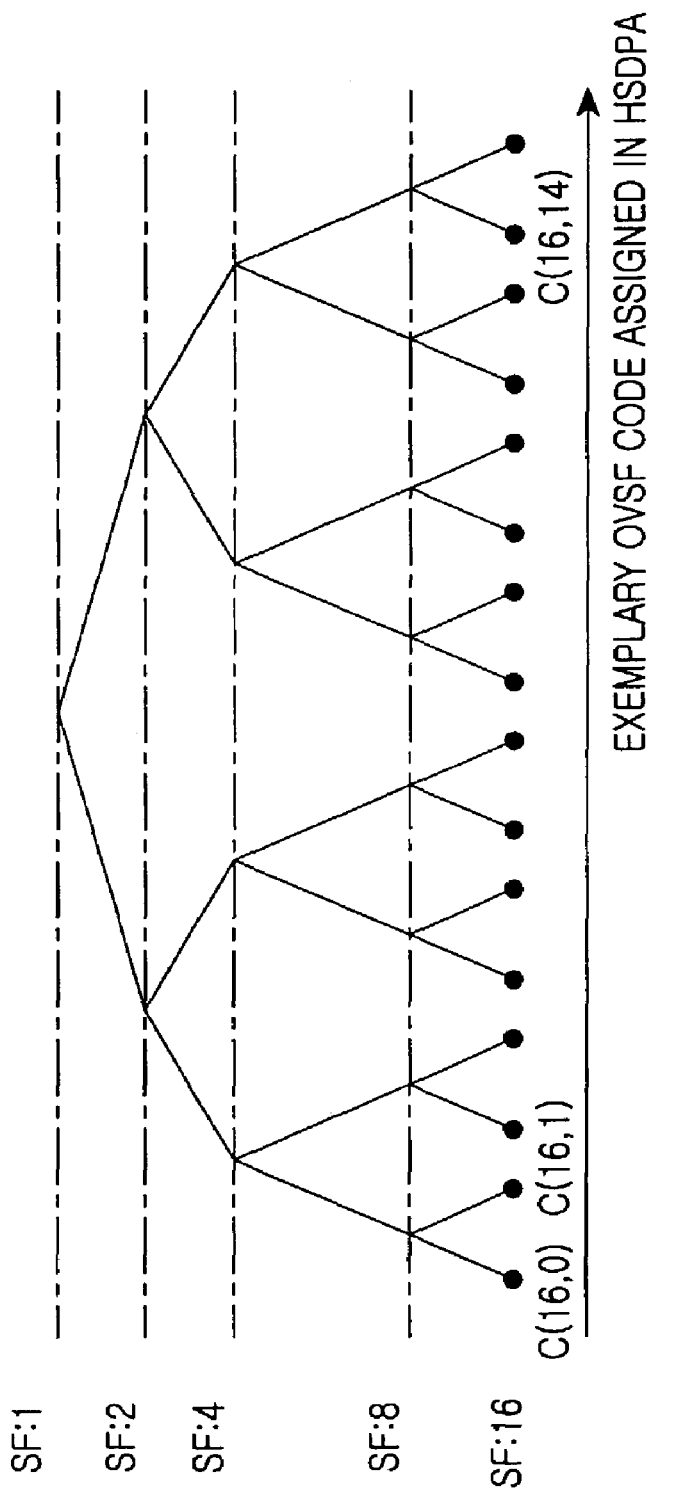
FIG. 2 is a view illustrating a tree of exemplary OVSF (Orthogonal Variable Spreading Factor) codes used in an HSDPA (High Speed Downlink Packet Access)
Figure 3:
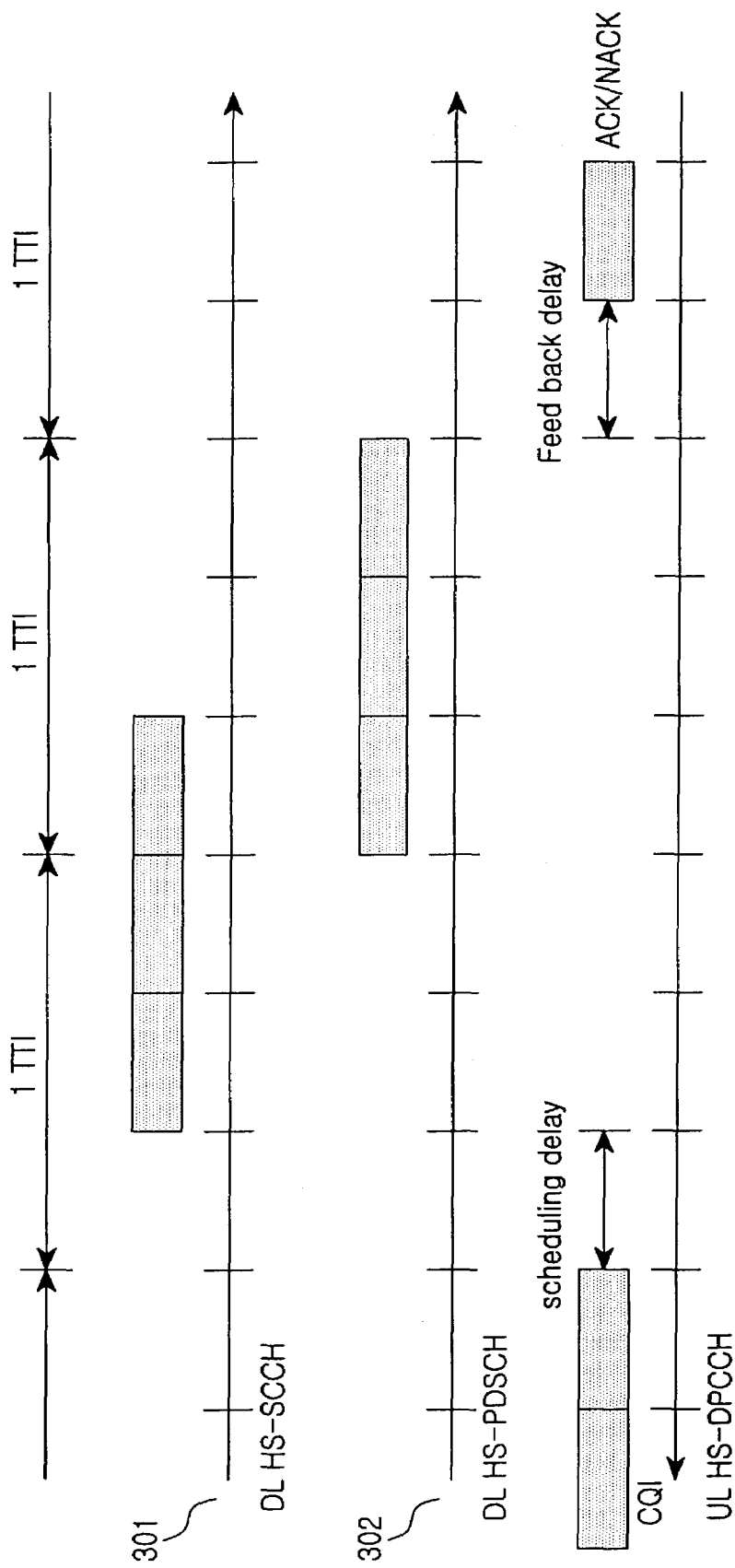
FIG. 3 is a view illustrating timing relations between channels operated for the HSDPA.
Figure 4:
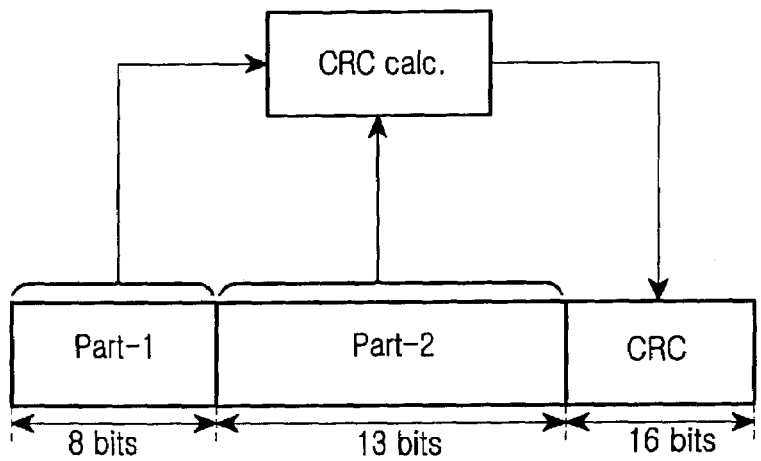
FIG. 4 is a view illustrating a structure of an HS-SCCH (High Speed-Shared Control CHannel), which transmits control information for an HS-PDSCH (High Speed-Physical Downlink Shared CHannel)
Figure 5:
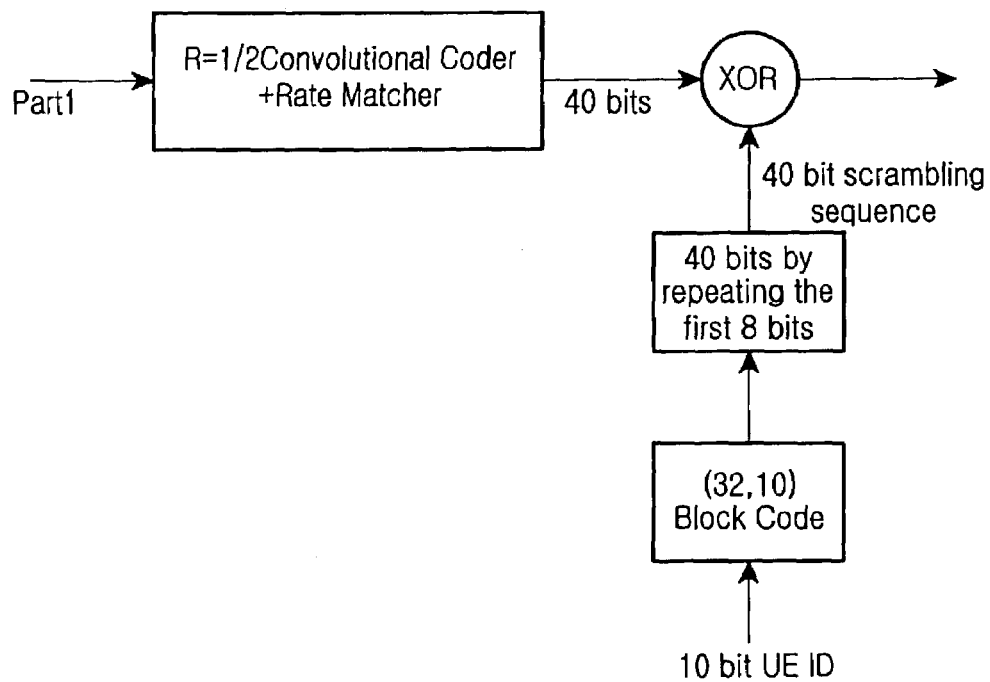
FIG. 5 is a view explaining a method for adding UE (User Equipment) identification information to the HS-SCCH, which transmits the control information for the HS-PDSCH.

Now, preferred embodiments of the present invention will be described in detail with reference to the annexed drawings. In the drawings, the same or similar elements are denoted by the same reference numerals even though they are depicted in different drawings.

In the following description given in conjunction with preferred embodiments of the present invention, a variety of specific elements such as specific messages or signals are shown. The description of such elements has been given only for a better understanding of the present invention. Those skilled in the art will appreciate that the present invention can be implemented without using the above-mentioned specific elements. Also, in the following description, a detailed description of known functions and configurations incorporated herein will be omitted when it may obscure the subject matter of the present invention.

Figure 8:
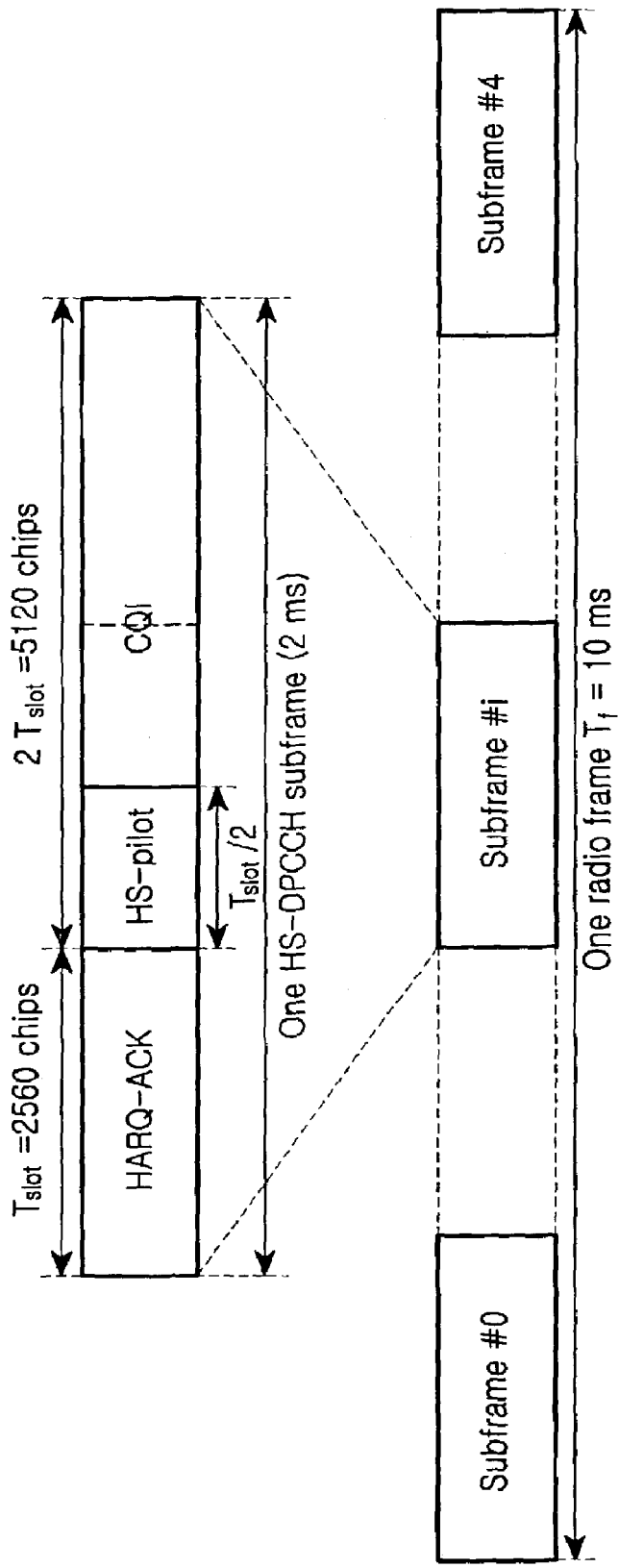
FIG. 8 is a view illustrating a structure of an HS-DPCCH where pilot bits are inserted into the HS-DPCCH being the uplink control channel for the HSDPA.

When HSDPA (High Speed Downlink Packet Access) UE (User Equipment) is located in a soft handover area, a Node-B transmits an HS-PDSCH (High Speed-Physical Downlink Shared CHannel) to the UE through a downlink. When the UE is located in the soft handover area as shown in FIG. 8, the UE can insert an HS-pilot signal into the HS-PDCCH to be sent to the Node-B such that the Node-B receiving an HS-DPCCH (High Speed-Dedicated Physical Control CHannel) from the UE efficiently performs channel compensation and power control for the HS-DPCCH. Using the HS-DPCCH, the Node-B can perform channel estimation, channel compensation and power control for the HS-DPCCH independent of an existing UL_DPCCH. A description of the channel estimation, channel compensation and power control using the HS-DPCCH is disclosed in detail in Korean Patent Application No. 2001-0072135 filed in the name of this applicant.

Figure 6:
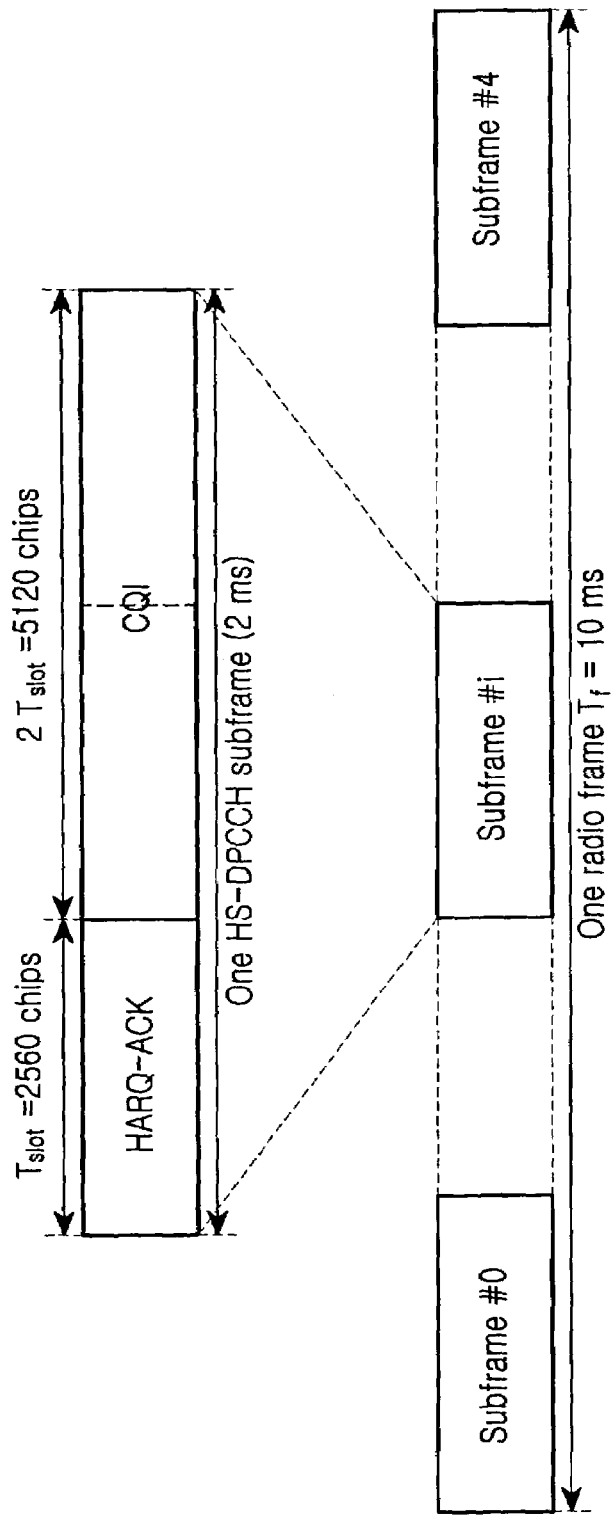
FIG. 6 is a view illustrating a structure of an HS-DPCCH (High Speed-Dedicated Physical Control CHannel) where pilot bits are not inserted into the HS-DPCCH being the uplink control channel for the HSDPA.

There is proposed an efficient channel coding method of the present invention applicable to two cases including the case that the HS-pilot signal is not inserted into the HS- DPCCH as shown in FIG. 6 and the case that the HS-pilot signal (e.g., 5-bit HS-pilot signal) is inserted in a second slot of an HS-DPCCH sub-frame as shown in FIG. 8.

Where the 5-bit HS-pilot signal is not inserted as shown in FIG. 6, 20 bits are assigned to send 5-bit CQI (Channel Quality Indicator) information. In this case, as the channel coding method for the CQI, optimum (20, 5) channel coding based on a linear combination of five basis vectors of length 20 shown in FIG. 7 is applicable as shown in the following Equation 1.

$$b_i = \sum_{n=0}^{4} (a_n M_{i,n}) \bmod 2, \; i = 0, 1, \cdots, 19 \qquad \text{[Equation 1]}$$

In the above Equation 1, $a_n$ is a CQI information bit and $b_i$ is an output bit from a channel coder for the CQI.

Where the 5-bit HS-pilot signal is inserted as shown in FIG. 8, 15 bits are assigned to send the 5-bit CQI information. In this case, as the channel coding method for the CQI, optimum (15, 5) channel coding based on a linear combination of five basis vectors of length 15 shown in FIG. 9 is applicable as shown in the following Equation 2.

$$b_i = \sum_{n=0}^{4} (a_n M_{i,n}) \bmod 2, \; i = 0, 1, \cdots, 14 \qquad \text{[Equation 2]}$$

In the above Equation 2, $a_n$ is a CQI information bit and $b_i$ is an output bit from a channel coder for the CQI.

When the 5-bit CQI information is sent on an HS-DPCCH, the (20, 5) channel coding based on basis vectors of length 20 shown in FIG. 7 is applied or the (15, 5) channel coding based on basis vectors of length 15 shown in FIG. 9 is applied, according to a transmission or non-transmission of the HS-pilot signal through the HS-DPCCH. The above-described two channel coding methods can be implemented by independent coders. However, there is a problem in that UE complexity increases when two channel coders are implemented to perform channel coding of the CQI information. There are proposed an apparatus and method capable of efficiently implementing the (20, 5) and (15, 5) channel codings of the CQI information without increasing the UE complexity in accordance with the present invention.

Figure 10:
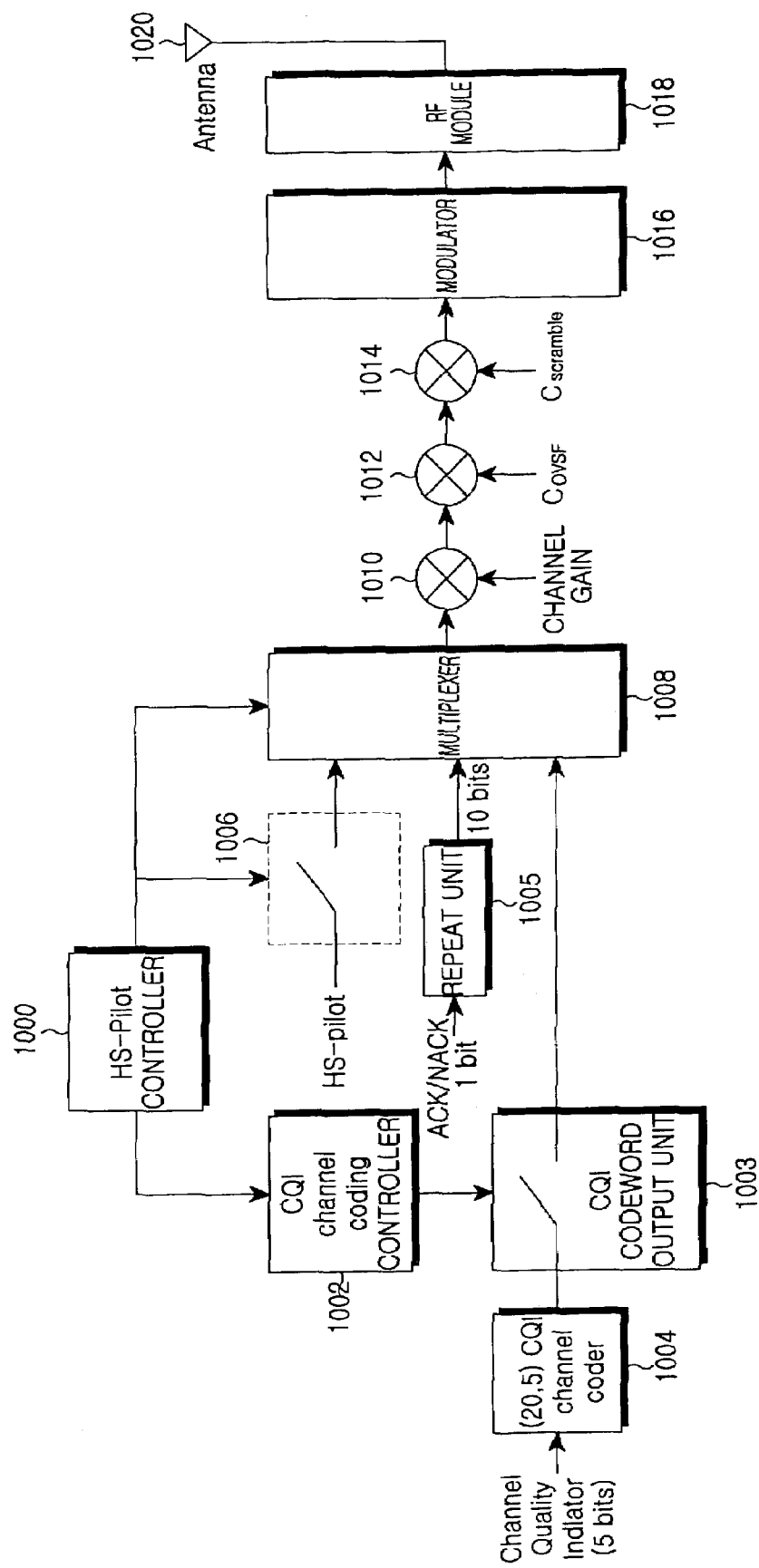
FIG. 10 is a view illustrating a structure of a transmitter included in UE (User Equipment) in accordance with the present invention.

When a basis vector shown in FIG. 7 is compared with that shown in FIG. 9, it can be found that the basis vector shown in FIG. 9 equals 15 bits except the last 5 bits of 20 bits shown in FIG. 7. The (20, 5) and (15, 5) channel codings of the CQI information can be implemented by an apparatus shown in FIG. 10 without increasing the UE complexity. FIG. 10 shows only devices for an HS-DPCCH directly associated with the present invention among channels of a DPCCH, a DPDCH, an HS-DPCCH, etc. The HS-DPCCH is sent through an I or Q channel. An operation of the apparatus shown in FIG. 10 is as follows.

A (20, 5) CQI channel coder 1004 carries out channel coding of the 5-bit CQI information to output 20 code bits to a CQI codeword output unit 1003. An HS-pilot controller 1000 determines whether an HS-pilot signal must be inserted into the HS-DPCCH. In response to a result of the determination, a CQI channel-coding controller 1002 controls the CQI codeword output unit 1003. Operations of the CQI channel-coding controller 1002 and the CQI codeword output unit 1003 are as follows. Where the HS-pilot signal is not inserted into the HS-DPCCH as shown in FIG. 6, the CQI codeword output unit 1003 outputs all codeword 20 bits outputted from a channel coder 1004. On the other hand, where the HS-pilot signal is inserted into the HS-DPCCH as shown in FIG. 8, the CQI codeword output unit 1003 is controlled such that only $b_0, b_1, \ldots, b_{14}$ being 15 bits of codeword bits outputted from the channel coder 1004 are outputted. A switch 1006 controlled by an HS-pilot controller 1000 applies or does not apply the HS-pilot signal to a multiplexer 1008. One-bit ACK (positive acknowledgement)/NACK (negative acknowledgement) information is repeated ten times by a repeat unit 1005 to produce 10 bits. The ACK/NACK information, the CQI codeword and the HS-pilot signal are multiplexed into an HS-DPCCH signal. A first multiplier 1010 multiplies the HS-DPCCH signal by a channel gain. The HS-DPCCH signal multiplied by the channel gain is then spread by the second multiplier 1012. The HS-DPCCH signal is then scrambled by a third multiplier 1014. The HS-DPCCH signal is then transmitted to an antenna 1020 through a modulator 1016 and an RF (Radio Frequency) module 1018.

The CQI codeword output unit 1003 shown in FIG. 10 receives 20 bits from the (20, 5) CQI channel coder 1004 and then outputs 20 or 15 code bits according to the control of the controller 1000.

In accordance with another embodiment of the present invention, the coder 1004 generates the 20 code bits of length 20 using a basis code of length 20 shown in FIG. 7 or generates the 15 code bits of length 15 using a new basis code of length 15 (0~14) except the last 5 bits (15~19) of a basis code of length 20 shown in FIG. 7, according to the control of the controller 1000. The generation method is the same as that shown in the above-described Equation 1 and Equation 2.

Figure 11:
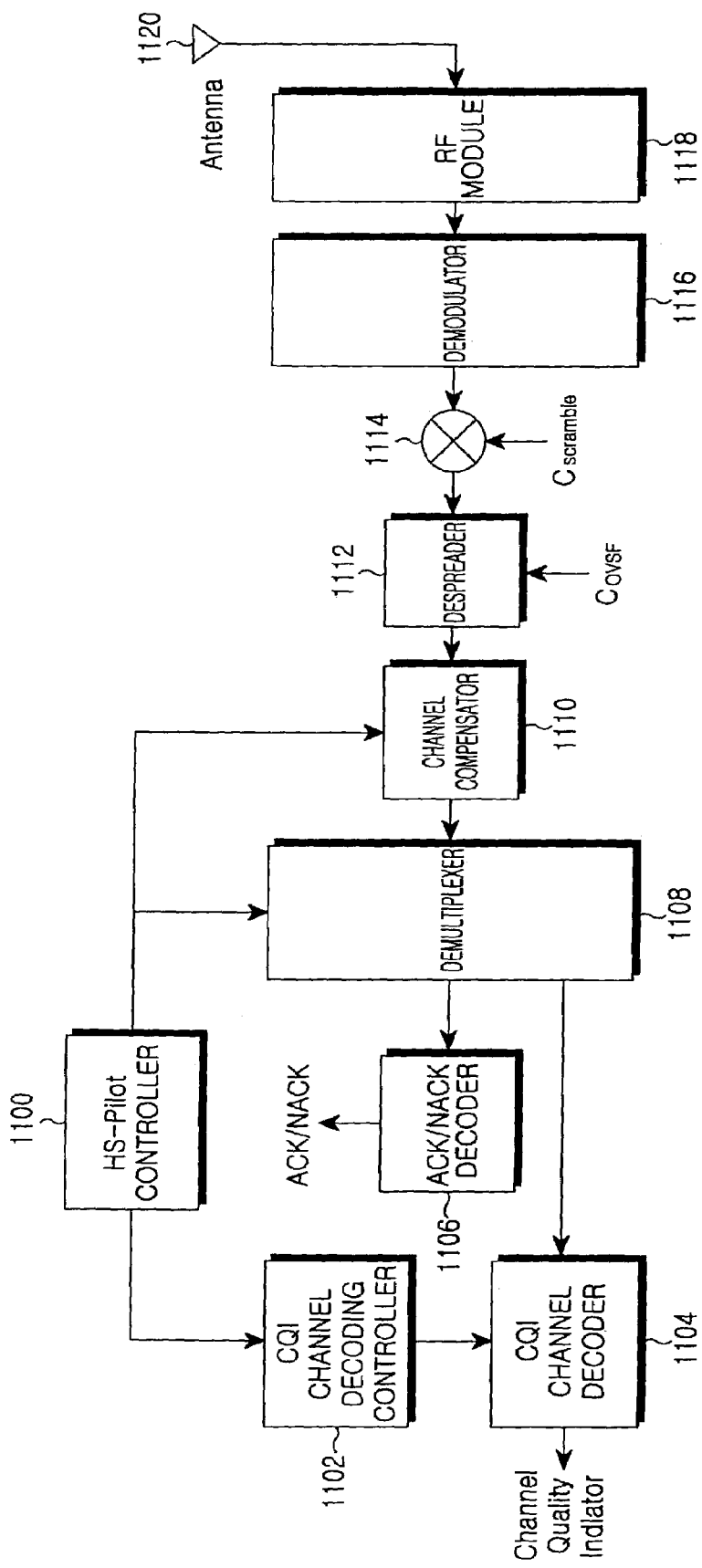
FIG. 11 is a view illustrating a structure of a receiver included in a Node-B in accordance with the present invention.

A receiver of a Node-B for the HS-DPCCH corresponding to a transmitter of UE shown in FIG. 10 is shown in FIG. 11. A signal received in an antenna 1120 is processed by an RF module 1118, a demodulator 1116, a descrambler 1114 and a despreader 1112. Channel distortion contained in the processed signal is compensated by a channel compensator 110. A channel estimation value for a channel compensation can be obtained using pilot bits of an existing UL DPCCH or using the HS-pilot signal when the HS-pilot signal is transmitted. Since operations of the channel compensator 1110, a demultiplexer 1108 and a CQI channel-decoding controller 1102 are different according to the existence of the HS-pilot signal, they are controlled by an HS-pilot controller 1100. The output of the channel compensator 1110 is divided into the ACK/NACK information and the CQI information. The ACK/NACK information and the CQI information are decoded by an ACK/NACK decoder 1106 and a CQI channel decoder 1104, respectively. The ACK/NACK decoder 1106 and the CQI channel decoder 1104 outputs 1-bit ACK/NACK information and 5-bit CQI information, respectively. The operation of the CQI channel decoder 1104 is controlled by the CQI channel-decoding controller 1102. Where the HS-pilot signal is not transmitted, the decoding of a (20, 5) code is performed. Otherwise, the decoding of a (15, 5) code is performed.

Figure 12:
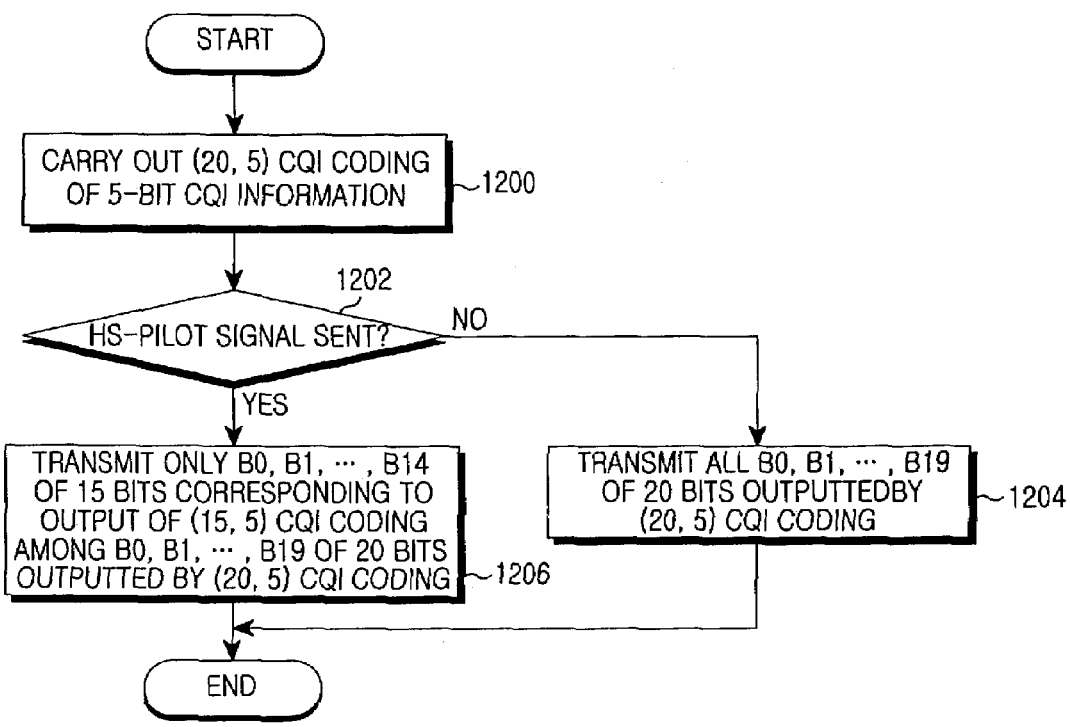
FIG. 12 is a flow chart illustrating an operation of the UE in accordance with the present invention.

FIG. 12 shows a procedure of performing channel coding of CQI information in the UE on the basis of a transmission or non-transmission of an HS-pilot signal through an uplink. At step 1200, (20, 5) CQI coding of 5-bit CQI information is carried out. At step 1202, it is determined whether the HS-pilot signal must be sent. If the HS-pilot signal is not transmitted, all $b_0, b_1, \ldots, b_{19}$ of 20 bits outputted by (20, 5) CQI coding are transmitted at step 1204. On the other hand, if the HS-pilot signal must be sent, only $b_0, b_1, \ldots, b_{14}$ of 15 bits corresponding to an output of (15, 5) CQI coding among $b_0$, $b_1, \ldots, b_{19}$ of 20 bits outputted by (20, 5) CQI coding are sent at step 1206.

Figure 13:
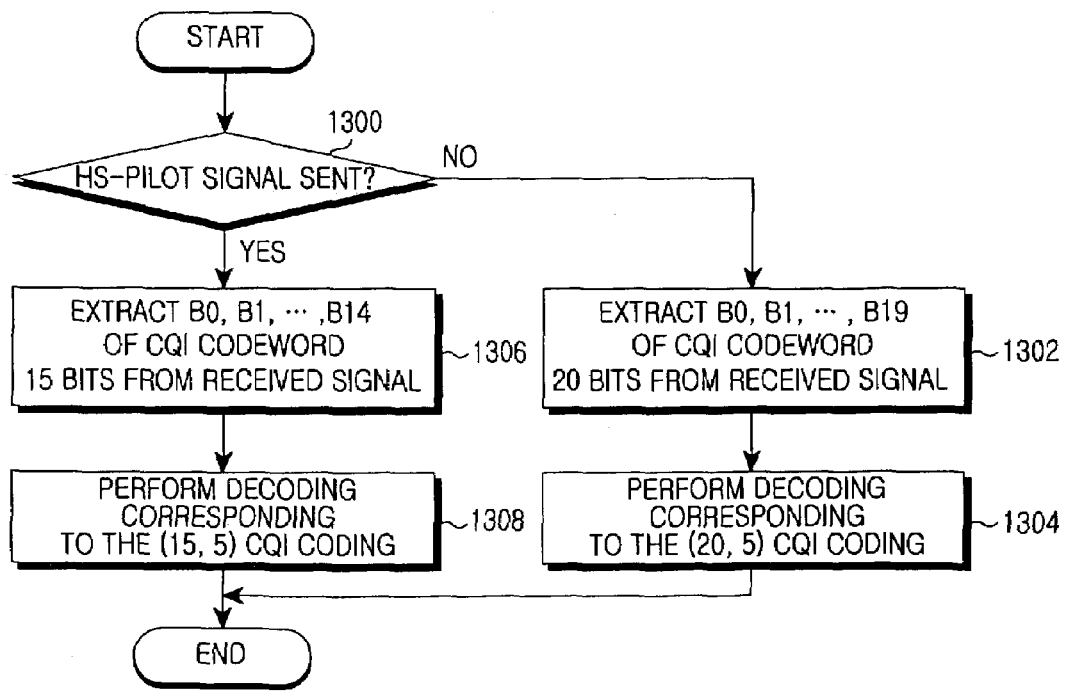
FIG. 13 is a flow chart illustrating an operation of the Node-B in accordance with the present invention.

FIG. 13 shows a procedure of performing channel decoding of CQI information in the Node-B on the basis of a transmission or non-transmission of an HS-pilot signal through an uplink. At step 1300, it is determined whether the transmission of the HS-pilot signal has been performed. If the transmission of the HS-pilot signal has not been performed, the Node-B extracts $b_0, b_1, \ldots, b_{19}$ of CQI codeword 20 bits from a received signal at step 1302 and then performs decoding corresponding to the (20, 5) CQI coding at step 1304. On the other hand, if the transmission of the HS-pilot signal has been performed, the Node-B extracts $b_0, b_1, \ldots, b_{14}$ of CQI codeword 15 bits from a received signal at step 1306 and then performs decoding corresponding to the (15, 5) CQI coding at step 1308.

The Node-B receives the HS-pilot signal and measures power of an HS-DPCCH signal transmitted from the UE. After measuring the power of the HS-DPCCH signal using the HS-pilot signal, the Node-B commands the UE to adjust transmission power of the HS-DPCCH signal.

As apparent from the above-description, the present invention provides a method for performing channel coding of CQI information, the method varying according to a transmission or non-transmission of pilot bits on an HS-DPCCH. In accordance with the present invention, channel coding and decoding, which vary according to the transmission or non-transmission of pilot bits on the HS-DPCCH, can be efficiently implemented without increasing complexity of the UE and Node-B.

Although the preferred embodiments of the present invention have been disclosed for illustrative purposes, those skilled in the art will appreciate that various modifications, additions and substitutions are possible, without departing from the scope of the invention. Accordingly, the present invention is not limited to the above-described embodiments, but the present invention is defined by the claims which follow, along with their full scope of equivalents.

What is claimed is:

1. A method for transmitting pilot bits and CQI (Channel Quality Indicator) bits on an uplink channel, the CQI bits indicating channel quality of an HS-PDSCH (High Speed-Physical Downlink Shared CHannel) in a CDMA (Code Division Multiple Access) communication system having a Node B for controlling power of a high-speed uplink control channel, the system transmitting high-speed packet data from the Node-B to UE (User Equipment) through the HS-PDSCH, the UE being located in a handover area between the Node-B and another Node-B adjacent thereto, the method comprising the steps of:
    (a) receiving the CQI information and generating code symbols;
    (b) removing predetermined bits from the code symbols; and
    (c) replacing the removed bits with high-speed pilot bits for power control.

2. The method as set forth in claim 1, wherein the CQI information is 5 bits in length and the code symbols is 20 bits in length.

3. The method as set forth in claim 1, wherein the code symbols are transmitted in two time slots.

4. The method as set forth in claim 1, wherein the predetermined bits removed from the code symbols are removed from the end of the code symbols.

5. The method as set forth in claim 4, wherein the predetermined bits removed from the code symbols is 5 bits.

6. A method for receiving pilot bits and CQI (Channel Quality Indicator) bits indicating channel quality of an HS-PDSCH (High Speed-Physical Downlink Shared CHannel) in a CDMA (Code Division Multiple Access) communication system having a Node B for controlling power of a high-speed uplink control channel, the system transmitting high-speed packet data from the Node-B to UE (User Equipment) through the HS-PDSCH, the UE being located in a handover area between the Node-B and another Node-B adjacent thereto, the method comprising the steps of:
    (a) receiving coded CQI symbols containing the pilot bits and removing the pilot bits added in a predetermined position;
    (b) inserting in the predetermined position predetermined bits previously removed from the coded CQI symbols; and
    (c) decoding the coded CQI symbols containing the predetermined bits and generating CQI information as a result of the decoding.

7. The method as set forth in claim 6, wherein the coded CQI symbols are of 20 bits in length, and the CQI information after the decoding is 5 bits in length.

8. The method as set forth in claim 6, wherein the coded CQI symbols are transmitted in two time slots.

9. The method as set forth in claim 6, wherein the predetermined bits inserted in the code symbols are inserted at the ends of the code symbols.

10. The method as set forth in claim 9, wherein the number of predetermined bits replaced in the code symbols is 5 bits.

11. A method for transmitting pilot bits contained in CQI (Channel Quality Indicator) information indicating channel quality of an HS-PDSCH (High Speed-Physical Downlink Shared CHannel) in a CDMA (Code Division Multiple Access) communication system having a Node B for controlling power of a high-speed uplink control channel, the system transmitting high-speed packet data from the Node-B to UE (User Equipment) through the HS-PDSCH, the UE being located in a handover area between the Node-B and another Node-B adjacent thereto, the method comprising the steps of:
    (a) receiving the CQI information and generating code symbols of a length reduced by a length of the pilot bits; and
    (b) adding high-speed pilot bits for power control in a predetermined position of the coded symbols.

12. The method as set forth in claim 11, wherein the CQI information is 5 bits in length and the number of the code symbols is 15 bits.

13. The method as set forth in claim 11, wherein the code symbols are transmitted in two time slots.

14. The method as set forth in claim 11, wherein the predetermined position in which the high speed pilot bits are added is a position adjacent to the coded symbols.

15. The method as set forth in claim 14, wherein the number high-speed pilot bits added to the code symbols is 5 bits.

16. A method for receiving pilot bits added instead of a position of coded CQI (Channel Quality Indicator) information indicating channel quality of an HS-PDSCH (High Speed-Physical Downlink Shared CHannel) in a CDMA (Code Division Multiple Access) communication system having a Node B for controlling power of a high-speed uplink control channel, the system transmitting high-speed packet data from the Node-B to UE (User Equipment) through the HS-PDSCH, the UE being located in a handover area between the Node-B and another Node-B adjacent thereto, the method comprising the steps of:
    (a) receiving coded CQI symbols to which the pilot bits have been added and removing the added pilot bits; and (b) decoding the CQI symbols from which the pilot bits have been removed, and generating CQI information as a result of the decoding.

17. The method as set forth in claim 16, wherein the coded CQI symbols are 15 bits in length and the CQI information as the result of the decoding is 5 bits in length.

18. The method as set forth in claim 16, wherein the coded CQI symbols to which the pilot bits have been added are transmitted in two time slots.

19. The method as set forth in claim 16, wherein a position in which the pilot bits are added to the coded CQI symbols is adjacent to the coded CQI symbols from which the pilot bits are removed.

20. The method as set forth in claim 19, wherein the pilot bits added to the coded CQI symbols is 5 bits in length.

21. An apparatus for transmitting pilot bits and CQI (Channel Quality Indicator) bits indicating channel quality of an HS-PDSCH (High Speed-Physical Downlink Shared CHannel) in a CDMA (Code Division Multiple Access) communication system having a Node B for controlling power of a high-speed uplink control channel, the system transmitting high-speed packet data from the Node-B to UE (User Equipment) through the HS-PDSCH, the UE being located in a handover area between the Node-B and another Node-B adjacent thereto, the apparatus comprising:
a coder for receiving the CQI information and generating code symbols; and
a controller for performing a control operation such that predetermined bits are removed from the code symbols and the removed bits are replaced with high-speed pilot bits for power control.

22. The apparatus as set forth in claim 21, wherein the CQI bits is 5 bits in length and the number of the code symbols of the given bits is 20 bits in length.

23. The apparatus as set forth in claim 21, wherein the symbols are transmitted in two time slots.

24. The apparatus as set forth in claim 21, wherein the predetermined bits removed from the code symbols are at the end of the code symbols.

25. The apparatus as set forth in claim 24, wherein the number of predetermined bits removed from the code symbols is 5 bits.

26. An apparatus for receiving pilot bits and CQI (Channel Quality Indicator) bits indicating channel quality of an HS-PDSCH (High Speed-Physical Downlink Shared CHannel) in a CDMA (Code Division Multiple Access) communication system having a Node B for controlling power of a high-speed up link control channel, the system transmitting high-speed packet data from the Node-B to UE (User Equipment) through the HS-PDSCH, the UF being located in a handover area between the Node-B and another Node-B adjacent thereto, the apparatus comprising:
a controller for performing a control operation such that coded CQI symbols containing the pilot bits are received, the pilot bits added in a predetermined position are removed, and the pilot bits are replaced with predetermined bits previously removed from the coded CQI symbols; and
a decoder for decoding the coded CQI symbols containing the predetermined bits and generating CQI information as a result of the decoding.

27. The apparatus as set forth in claim 26, wherein the coded CQI symbols are 20 bits in length, and the CQI information as the result of the decoding is 5 bits in length.

28. The apparatus as set forth in claim 26, wherein the coded CQI symbols are transmitted in two time slots.

29. The apparatus as set forth in claim 26, wherein the predetermined bits of the code symbols are at the end of the code symbols.

30. The apparatus as set forth in claim 29, wherein the number of predetermined bits of the code symbols is 5 bits.

31. An apparatus for transmitting pilot bits contained in CQI (Channel Quality Indicator) information indicating channel quality of an HS-PDSCH (High Speed-Physical Downlink Shared CHannel) in a CDMA (Code Division Multiple Access) communication system having a Node B for controlling power of a high-speed uplink control channel, the system transmitting high-speed packet data from the Node-B to UE (User Equipment) through the HS-PDSCH, the UE being located in a handover area between the Node-B and another Node-B adjacent thereto, the apparatus comprising:
a coder for receiving the CQI information and generating code symbols reduced by a length of the pilot bits; and
a multiplexer for adding high-speed pilot bits for power control in a predetermined position of the coded symbols and performing a multiplexing operation.

32. The apparatus as set forth in claim 31, wherein the CQI information is 5 bits in length and the number of the code symbols of the given bits is 15 bits.

33. The apparatus as set forth in claim 31, wherein the symbols are transmitted in two time slots.

34. The apparatus as set forth in claim 31, wherein a position in which the high-speed pilot bits are added to the code symbols is a position adjacent to the code symbols.

35. The apparatus as set forth in claim 34, wherein the number of high-speed pilot bits added to the code symbols is 5 bits.

36. An apparatus for receiving pilot bits added instead of a position of CQI (Channel Quality Indicator) information indicating channel quality of an HS-PDSCH (High Speed-Physical Downlink Shared CHannel) in a CDMA (Code Division Multiple Access) communication system having a Node B for controlling power of a high-speed uplink control channel, the system transmitting high-speed packet data from the Node-B to UE (User Equipment) through the HS-PDSCH, the UE being located in a handover area between the Node-B and another Node-B adjacent thereto, the apparatus comprising:
a demultiplexer for receiving coded CQI symbols to which the pilot bits are added, removing the added pilot bits and outputting the coded CQI symbols from which the added pilot bits are removed; and
a decoder for decoding the CQI symbols from which the pilot bits are removed and generating CQI information as a result of the decoding.

37. The apparatus as set forth in claim 36, wherein the coded CQI symbols are 15 bits in length and the CQI information as the result of the decoding is 5 bits in length.

38. The apparatus as set forth in claim 36, wherein the coded CQI symbols to which the pilot bits are added are transmitted in two time slots.

39. The apparatus as set forth in claim 36, wherein a position in which high-speed pilot bits are added to the coded CQI symbols is a position adjacent to the coded CQI symbols from which the pilot bits are removed.

40. The apparatus as set forth in claim 39, wherein the number of high-speed pilot bits added to the coded CQI symbols is 5 bits.

* * * * *